United States Patent [19]
Walden

[11] Patent Number: 4,783,052
[45] Date of Patent: Nov. 8, 1988

[54] COMPOSITE ARTICLE HAVING INSERT

[75] Inventor: Larry J. Walden, Bartlesville, Okla.

[73] Assignee: Phillips Petroleum Company, Bartlesville, Okla.

[21] Appl. No.: 120,295

[22] Filed: Nov. 13, 1987

[51] Int. Cl.⁴ ............................................. F16K 1/22
[52] U.S. Cl. ................................ 251/368; 251/305; 251/358
[58] Field of Search ............... 251/356, 358, 368, 304, 251/305; 29/157.1 R; 137/315, 15; 428/298

[56] References Cited

U.S. PATENT DOCUMENTS

| 3,994,319 | 11/1976 | Airhart | 251/368 |
| 4,227,675 | 10/1980 | Sutter et al. | 251/306 |
| 4,451,528 | 5/1984 | Krause | 428/287 |
| 4,530,147 | 7/1985 | Mattei et al. | 29/525 |
| 4,603,071 | 7/1986 | Wehnert et al. | 428/112 |
| 4,645,565 | 2/1987 | Vallee | 162/123 |
| 4,695,602 | 9/1987 | Crosby et al. | 524/439 |

OTHER PUBLICATIONS

Chem Eng Prog 6/86–Asphahani et al., "Overview of Advanced Material Technology".
Plastic Tech 6/86–Krone et al., "Processing Thermoplastic Advanced Composites".
SAMPE Meeting 10/86–Murtha et al, "Properties and Processing of Ryton PPS Composites".

Primary Examiner—A. Michael Chambers
Attorney, Agent, or Firm—Williams, Phillips & Umphlett

[57] ABSTRACT

A fiber reinforced composite article such as a valve element is provided with a reinforcing insert.

11 Claims, 2 Drawing Sheets

COMPOSITE ARTICLE HAVING INSERT

BACKGROUND OF THE INVENTION

This invention relates to a reinforced valve element.

Thermopress molding is an extremely desirable technique to use to form articles from thermoplastic composite materials since it enables the use of long fiber reinforcement. Long fiber reinforcement in composite articles generally provides highest performance. However, when the long fiber reinforcement is highly oriented, such as in the form of a woven mat, poor fiber flow during the molding operation of thermoplastic composite leaves fiber deficient areas which are prone to premature failure.

Better fiber distribution results when random fiber mat is the reinforcement in a thermoplastic composite. Random fibers enjoy higher mobility than highly oriented fibers and become well distributed throughout the molded articles. However, molded articles reinforced with random fiber reinforcement are prone to failure at high stress points because random fibers do not impart the highest performance properties. Techniques for selectively providing the high stress points of random fiber reinforced articles with additional reinforcement would be very desirable.

OBJECTS OF THE INVENTION

The object of this invention is to provide a molded article in which effective additional reinforcement has been selectively provided in a localized high stress area.

STATEMENT OF THE INVENTION

In accordance with the invention, there is provided a valve element having a reinforcing insert. The valve element is formed from a composite thermoplastic matrix which contains fiber reinforcement and has a disc-like outer shape with an outer circumference which is usually generally circularly or cylindrically shaped. A plane of symmetry of the disc passes through the outer circumference of the disc. A pair of opposed bores extend generally diametrically inwardly toward the center of the disc from the outer circumference thereof. At least one of these opposed bores according to the invention is defined by an insert which is encapsulated by the thermoplastic matrix forming the remainder of the valve element so as to be an integral part of the valve element. The insert is characterized as a tube having a pair of opposed generally radially outwardly protruding fins extending generally longitudinally along an exterior surface of said tube, wherein the opposed fins are positioned in the plane of symmetry of the disc.

DETAILED DESCRIPTION OF THE INVENTION

Figure 1:
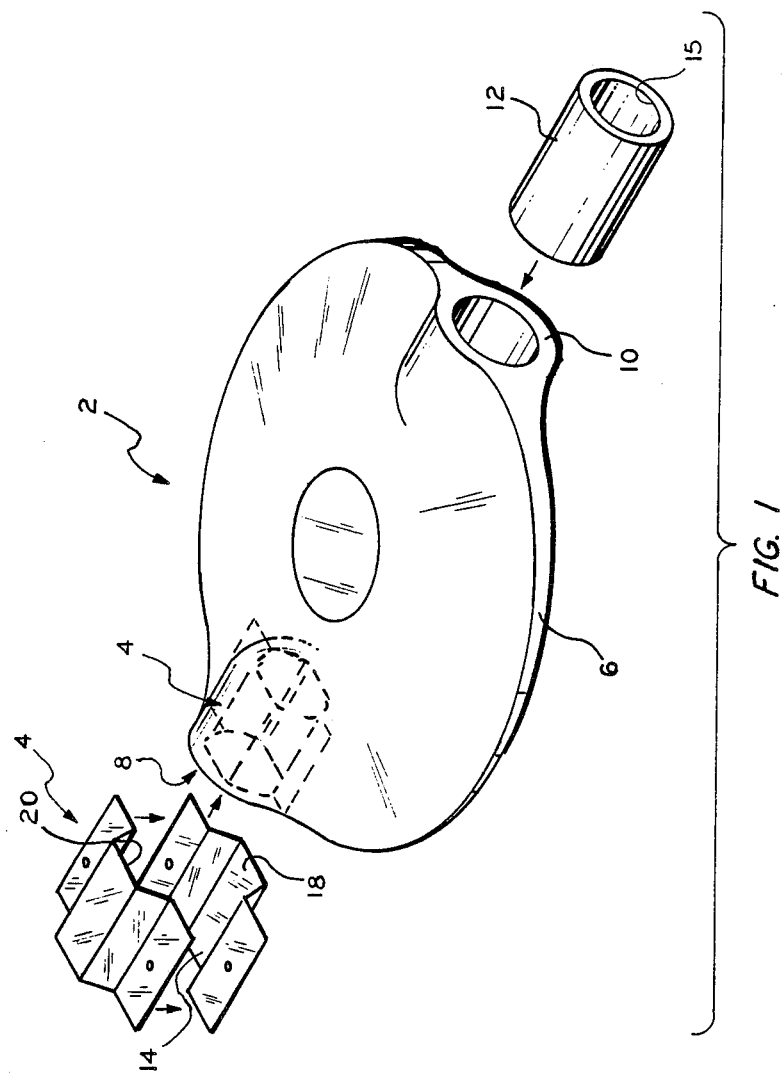
FIG. 1 is a pictoral representation illustrating in exploded view a valve element incorporating certain features of the present invention.

In accordance with one embodiment of the present invention, there is provided a valve element called out generally by the reference numeral 2 which is formed from a thermoplastic matrix containing fiber reinforcement and has encapsulated therein at least one insert 4 which provides localized reinforcement to a high stress area of the valve element 2. Generally speaking, the valve element 2 will have a disc-like outer shape and an outer circumference 6 which is generally circular or cylindrical in shape. A disc plane of symmetry extends through the outer circumference, preferably through the center line thereof. A pair of opposed bores 8 and 10, preferably separate, extend diametrically inwardly toward the center of the disc from the outer circumference 6. At least one of said separate opposed bores 8 or 10 is defined by the insert 4. In the embodiment of the invention shown, the insert 4 is positioned to define the borehole 8 and an insert 12 is positioned to define the borehole 10.

The thermoplastic matrix utilized to form the valve element will usually be selected from the group consisting of polyethylene, polypropylene, polytetrafluoroethylene, polyamide and poly(arylene sulfide), and copolymers based on such materials, since these materials are commercially available and well suited for composite production. Most preferably, the matrix is formed from a poly(arylene sulfide) polymer (hereinafter PAS) because PAS has excellent corrosion resistance and strength and can be used over a wide temperature range. The preferred PAS comprises a poly(phenylene sulfide), (hereinafter PPS), which term includes homopolymers, copolymers, terpolymers and the like which have a melting or softening temperature of at least about 300° F. Preferred PPS usually has a melting or softening point in the range of from about 500° to about 650° F. Preferably, the PPS has a melting or softening point such that it processes between about 600° F. and about 650° F. For processing purposes, it is preferred that the PPS have a melt flow in the range of from about 1 to about 500 g/10 minutes, preferably in the range of from about 25 to about 250 g/10 minutes. The melt flow of PPS can be regulated by incorporating small amounts of trichlorobenzene comonomer into the polymerization reactor or by "curing" the polymer by air exposure at elevated temperatures.

The fiber reinforcement used in the valve element can be selected from a wide variety of materials. Preferably, the reinforcing fibers are selected from the group consisting of glass, carbon, aramid, metals, and ceramics, although glass or carbon fibers are preferred because they are economical and provide good properties in the final product. Fiber reinforcement in the form of random mat is preferred, although short random fiber reinforcement in the form of injection molding compound can also be used. Generally, the valve element will comprise in the range of 20 wt. % to 70 wt. % reinforcing fiber, the remainder being thermoplastic matrix.

The insert is preferably fabricated by stamp molding a blank over a die having half of the desired interior shape of the bore. A pair of the thus stamped blanks are fastened together to form the insert. The insert can be formed from metal, such as steel, reinforced thermoset composite, such as epoxy, or reinforced thermoplastic composite, such as PPS, as desired. When the insert is formed from reinforced thermoplastic composite, the matrix and reinforcing fiber are preferably as identified above. The fiber, however, is preferably in oriented form, such as in the form of fabric or unidirectional tape. Steel halves can be electrically spot welded together, expoxy insert halves can be glued together, and thermoplastic insert halves can be sonically spot welded together.

The insert 4 preferably has an inside surface 14 which determines the bore and the inside surface is preferably noncylindrically shaped so as to provide engagement with a shaft (not shown) when inserted thereinto. Where inserts are positioned around each of the opposed bores, the borehole which is opposite from the noncylindrically shaped borehole can be provided with a smooth and cylindrical inside surface 15. The borehole 8 which is noncylindrically shaped is preferably provided with at least one pair of opposed flats 18 and 20 since a pair of flats will provide adequate engagement for the drive shaft and a flat is easy to provide by stamping the blank half on a suitably shaped die.

Figure 2:
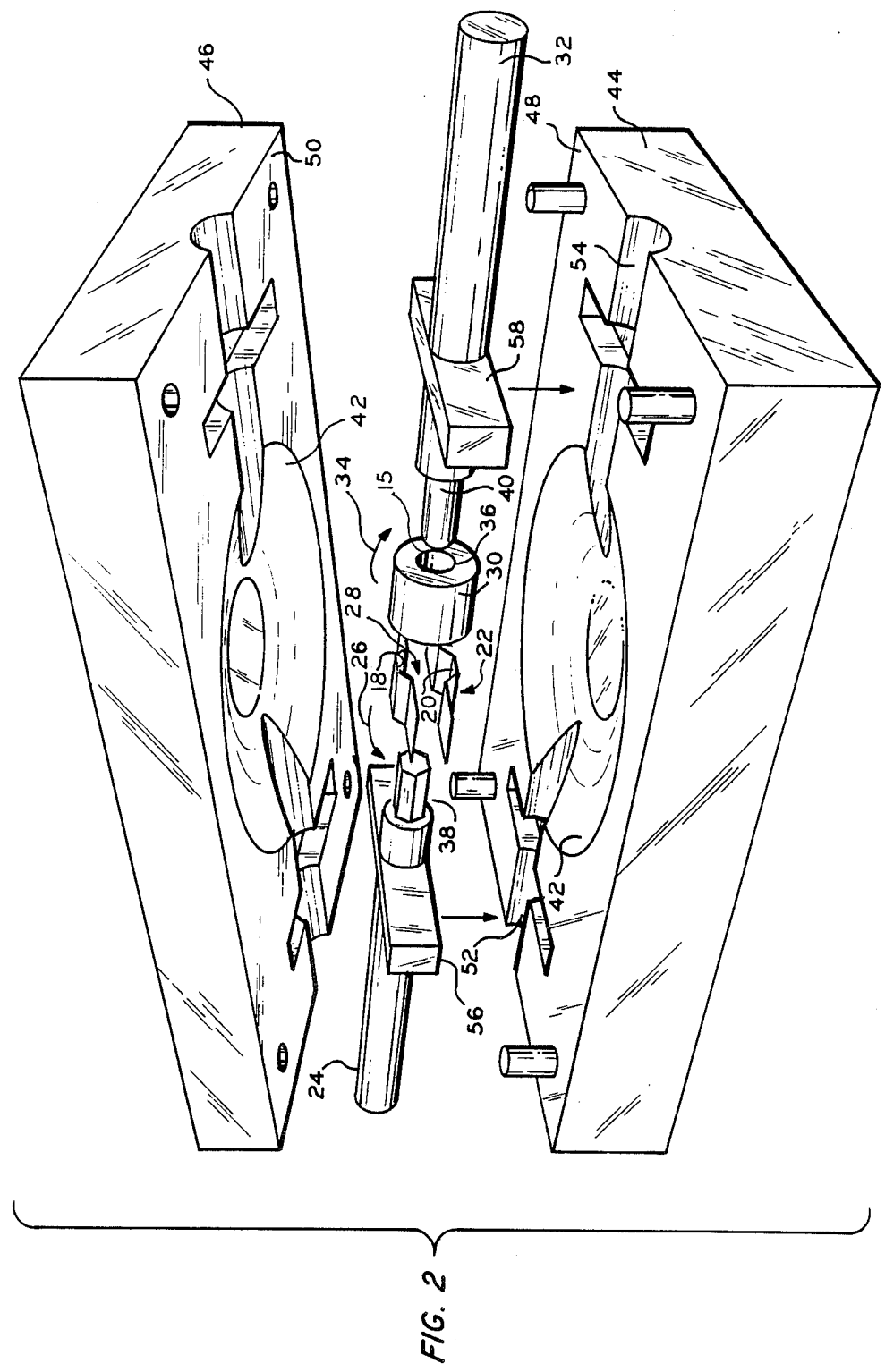
FIG. 2 is a pictoral representation illustrating the process by which the valve element of the invention can be produced.

FIG. 2 illustrates the process of the present invention. In accordance with the embodiment of the invention illustrated in FIG. 2, insert 22 is positioned on a mandrel 24 as indicated by arrow 26. The insert 22 preferably has a borehole 28 therein which is noncyclindrically shaped. An optional second insert 30 can be positioned on mandrel 32 as indicated by arrow 34 if desired. The insert 30 may have a cylindrically shaped borehole 36. The mandrels 24 and 32 have end portions 38 and 40 respectively which closely receive the boreholes 28 and 36 of the respective inserts 22 and 30 to reliably position the inserts and to maintain the desired shape of the borehole in the final product where the inserts are formed of softenable thermoplastic or uncured thermoset. All corners on the end portions 38 and 40 are preferably rounded to avoid locations highly prone to failure in the articles produced.

The mandrel 38 having the insert 22 mounted thereon is positioned in a portion of a mold cavity 42. In the embodiment of the invention illustrated in FIG. 2, mold cavity 42 is determined between a pair of mold blocks 44 and 46 having matching faces 48 and 50 respectively. The block 44 is provided with channels 52 and 54 to receive the mandrels 24 and 32 respectively. The block 46 is provided with similar channels. Register means 56 and 58 are provided on the mandrels 24 and 32 respectively for engagement with registry receipts in the blocks to position the mandrels 24 and 32 during the molding operation.

The remainder of the mold cavity 42 (not occupied by the shafts 24 and 32 having inserts 22 and 30 thereon) is filled with fiber reinforced thermoplastic matrix preferably so that the completed article is predominantly reinforced with random fibers. In the embodiment of the invention illustrated in FIG. 2, which is a press mold, the preferred technique for this step is as follows. Smooth blank composite sheets cut and weighed for correct size, are loaded onto a conveyor screen which then moves through an infrared oven. After the correct molding temperature has been reached (usually 25° to 100° F. above the softening point of the resin, 600°-650° F. for PPS), the blanks, now rough textured, exit the heating system and are quickly transferred to the mold cavity 42. The mold can be heated if desired. In the case of PPS, the mold is preferably heated to a temperature in the range of 200° F.-300° F. A first portion of the heated blank charge to the mold is positioned in a lower portion of the mold cavity 42. The mandrels and inserts are positioned. The remaining portion of the heated blank charge to the mold is positioned on the top of the mandrels and inserts. An article in the shape of the mold cavity 42 which has the inserts 22 and 30 encapsulated therein is then produced. In the embodiment of the invention illustrated in FIG. 2 the article is stamp molded. The invention could be practiced in an injection molding apparatus, not shown, if desired. The molded article in the stamp mold is then held under pressure (2-6,000 psi) by a mechanical or hydraulic press (closing speed of usually greater than 200 in./min. usually 200-500 in./min.) until the article has cooled sufficiently to retain its shape. Cooling generally requires less than 2 minutes. The article is then removed from the mold cavity 42. The mandrels 24 and 32 are removed from the article thus defining at least one borehole in the article which is reinforced with the insert.

Preferably, the article is molded utilizing a press molding technique. The blank composite sheets are preferably reinforced with random fiber mat to provide for fiber flow to all portions of the article during the molding procedure. However, the invention can also be practiced to produce an injection molded article in which case the mold cavity will be filled with a thermoplastic matrix which is reinforced with short random fibers. By short is meant fibers having a length of 1 cm or less, usually in the range of from about 0.01 up to about 1 cm. Either way, the mold cavity is brought up to sufficient pressure, in the case of stamp molding, generally from abut 2,000 to about 6,000 psi, to cause the thermoplastic material with which the remainder of the mold cavity 42 has been filled to form an integral thermoplastic matrix throughout the article.

The valve element formed according to the invention is used in butterfly valves, for example, to control fluid flows.

That which is claimed is:

1. A valve element formed from a thermoplastic matrix containing fiber reinforcement, said valve element having a disc-like shape and an outer generally circular circumference through which extends a disc plane of symmetry and a pair of opposed bores extending generally diametrically inwardly toward the center of the disc from the outer circumference; at least one of said opposed bores being at least partly defined by an insert which is encapsulated by the thermoplastic matrix so as to form an integral part of the valve element, wherein the insert is characterized as a tube having a pair of opposed generally radially outwardly protruding fins extending generally longitudinally along an exterior surface of said tube, said opposed fins being positioned generally in the disc plane.

2. A valve element as in claim 1 wherein the fiber reinforcement in the valve element is predominantly random mat.

3. A valve element as in claim 2 wherein the thermoplastic matrix is selected from the group consisting of polyethylene, polypropylene, polytetrafluoroethylene, polyamide and poly(arylene sulfide).

4. A valve element as in claim 3 wherein the fiber reinforcement in the valve element is selected from the group consisting of carbon fiber and glass fiber.

5. A valve element as in claim 4 wherein the tube forming the insert has an inside surface which determines the bore, wherein said inside surface is noncylindrically shaped so as to provide engagement with a shaft when inserted thereinto.

6. A valve element as in claim 5 wherein said inside surface is characterized by at least one pair of opposed flats.

7. A valve element as in claim 6 wherein the thermoplastic matrix comprises a poly(arylene sulfide) and the fiber reinforcement is selected from the group consisting of glass fiber and carbon fiber.

8. A valve element as in claim 7 wherein the thermoplastic matrix comprises a poly(phenylene sulfide).

9. A valve element as in claim 6 wherein the tube is formed from a pair of stamp molded tube halves.

10. A valve element as in claim 9 wherein the tube halves are constructed of metal.

11. A valve element as in claim 9 wherein the tube halves are constructed of composite sheet or unidirectional tape.

* * * * *